Figure 1:
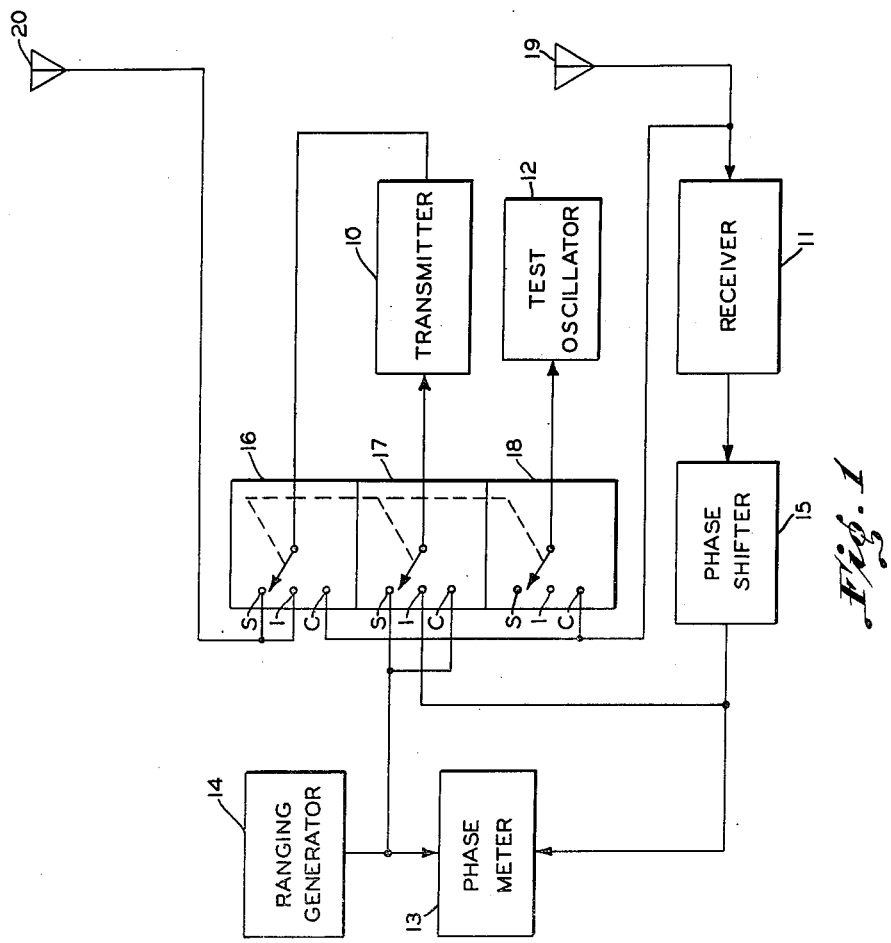

April 8, 1952 G. SHAPIRO 2,591,731
MEASURING SYSTEM
Filed May 30, 1945 2 SHEETS—SHEET 1

INVENTOR.
GUSTAVE SHAPIRO
BY
William D. Hall.
ATTORNEY

INVENTOR.
GUSTAVE SHAPIRO
BY
William D. Hall.
ATTORNEY

Patented Apr. 8, 1952

2,591,731

UNITED STATES PATENT OFFICE 2,591,731

MEASURING SYSTEM

Gustave Shapiro, Asbury Park, N. J., assignor to the United States of America as represented by the Secretary of War Application May 30, 1945, Serial No. 596,715

7 Claims. (Cl. 343—12)

(Granted under the act of March 3, 1883, as amended April 30, 1928; 370 O. G. 757)

The invention described herein may be manufactured and used by or for the Government for governmental purposes, without the payment to me of any royalty thereon.

My present invention pertains to a method of and means for measuring distances by the use of continuously radiated electromagnetic waves, and more particularly but not exclusively to the determination of range between variously disposed radio communication field stations.

Numerous electromagnetic wave systems for range determination are in present use. In one of these systems, the distance between two points is ascertained by continuously radiating high frequency sine-wave energy at one point, reflecting or retransmitting said energy at the second point, and comparing at the first point the phase of the original transmitted energy with that of the reflected or retransmitted energy. The phase difference between the original and the retransmitted energies, being a function of the distance separating the points, is utilized in calculating the range between said points.

Inasmuch as high frequency energy shifts its phase 180 degrees many times in relatively short distances of travel, the utilization of these phase differences for the aforementioned purpose is beset with difficulties, and is not especially accurate. It has been found that if a high frequency wave is modulated by a relatively low frequency wave and the shift in phase of the low frequency component serves as the standard for the distance measurement, these difficulties and inaccuracies are at least partially resolved. The principle of ranging with a high frequency carrier having a low frequency modulation component is the basis for the system designated as the range-determining system.

The object of the range-determining system is to measure the range between two fixed or mobile communication stations. This object is attained by transmitting in channel A from the first station a carrier having a low frequency modulation component, receiving and demodulating the channel A carrier at the second station, impressing the received channel A modulation component as a modulation signal on the second station transmitter emitting a carrier in channel B, and receiving and demodulating the channel B carrier at the first station. The modulation component in its initial phase is compared at the first station with the modulation component displaced in phase as a function of the distance to and from the second station, and the range is then calculated. The ranging measurements in the range-determining system be taken at either the first or second station, depending on where the modulation signal is originated.

For purposes of clarity, the station at which the modulation signal is originated and where the range measurements are taken will hereinafter be referred to in this specification as the "superior" station, whereas the station retransmitting the modulation signal will be identified as the "inferior" station.

The specific modulation frequency applied to the high frequency carrier is determined by the range requirements of the system, viz., the maximum modulation frequency allowable would be that whose period is equal to the time necessary for the transmitted wave to travel from the superior to the inferior station and return. If, for example, it is desired to have the system range within an area circumscribed by a radius of 10,000 yards (9,144+ meters), the minimum period of the modulation frequency would have to be equal to 20,000 yards, and in this case, therefore, the required modulation frequency would be 16,404 cycles. Thus, if in operation, the phase of the original wave is compared with a received wave and it is indicated that the latter wave lags the former by 90 degrees, the distance between stations is now known to be 2,500 yards.

Heretofore, however, the range-determining system has suffered from inaccuracies developed because of variable phase shifts arising in the receivers and transmitters of the superior or inferior stations. These variable phase shifts, when integrated with the phase shifts existing as a function of the distance between stations, result in spurious range indications which greatly detract from the usefulness of the system.

It has been empirically determined that variable phase shifts may evolve because of the detuning of the receiver from the carrier frequency, variations in the carrier signal strength, temperature changes, and numerous other factors causing variable phase shifts. The separate control and correction of each of the factors leading to phase shifts in order to maintain the accuracy of the system is an exacting task which complicates the operation of the system and increases the expense of construction because of the need for carefully adjusted precision devices of narrow tolerances.

Accordingly, it is the principal object of this invention to provide an improved range-determining system, entailing the use of high frequency waves having a low frequency modulation component, wherein all variable phase shifts arising in either the transmitter or receiver of a superior or inferior station are compensated for, thereby enhancing the accuracy of the system.

It is an additional object of my invention to provide an improved system of the above type wherein all variable phase shifts are compensated for by simple, inexpensive means not requiring undue skill in adjustment on the part of the operator.

A further object of my invention is to provide an improved ranging system of the above type wherein the ranging measurement may be accomplished by the use of standard radiotelephone communications equipment without interference with voice modulation frequencies simultaneously transmitted.

A still further object of my invention is to provide an improved ranging system of the above type in the form of a universal unit which is immediately convertible from a superior to an inferior station by a single switching operation, while at the same time maintaining its regular radiotelephone communication in either condition.

In general, my system comprises a communication station having the following elements: a radio transmitter, including modulation means; a ranging frequency generator, furnishing the low frequency modulation; a radio receiver; a phase meter; and a phase-shifting device. Also provided is a test oscillator of high frequency stability.

Each station is designed to perform either as a superior or inferior station, depending upon the association of the elements as arranged by switching operations.

In ranging between two stations situated at points remote from each other, one station, which in this example will be the superior, has its transmitter set on frequency A, and its receiver set on frequency B, while the other station, now the inferior, has its receiver resonant to frequency A and its transmitter on frequency B. The superior transmitter is modulated by a low frequency signal derived from the ranging generator and the superior transmission is received and demodulated by the inferior receiver, so that the output of said receiver yields the low frequency ranging component. The inferior receiver output is applied to the inferior transmitter as a modulation signal and the inferior transmission is in turn received and demodulated by the superior receiver. The output of the superior receiver is therefore the low frequency ranging component which is now delayed in phase as a function of the distance to and from the inferior station.

A phase meter is associated both with the output of the superior receiver and with the output of the superior ranging generator. The meter compares the phase of the low frequency ranging signal as drawn directly from the ranging generator, with the delayed phase of the ranging signal, as yielded by the receiver, and the comparison phase measurement is translated in terms of distance.

The method described thus far has assumed the absence of variable phase shifts in either the inferior or superior station. Actually, in practice, phase shifts will occur in the equipment of both the superior and inferior stations and consequently it is necessary prior to undertaking range measurement in accordance with the above procedure to calibrate each station to zero phase displacement. This calibration is effected by means of the test oscillator and the phase-shifting device included with the equipment of the station.

The test oscillator is a piezoelectric, crystal-controlled oscillator or an oscillator of like characteristics, which operates on a frequency equal to the difference between the carrier frequency of the transmitter and the resonant frequency of the receiver. The output of the test oscillator is heterodyned with the carrier frequency and the combination thereof is applied to the input of the receiver. One of the resultant beat frequencies, being equal to the resonant frequency of the receiver, is amplified and detected therein. During calibration the carrier is modulated by the ranging generator, hence the output of the receiver is the low frequency component of the transmitter carrier.

The output of the receiver is compared in phase with the low frequency ranging signal derived directly from the ranging generator by the phase meter. The phase-shifter device is electrically interposed between the phase meter and the receiver output so that by adjusting said device in phase opposition to the phase displacement introduced by the system, said displacement, regardless of its direction or degree, will be cancelled. This is indicated when the phase meter reads zero degrees.

While calibration is in progress, the transmitter is not permitted to radiate. Upon completion of the calibration process, coordination is established between stations and range measurement may be accurately obtained, inasmuch as the phase displacement is now exclusively a function of the distance between stations.

The effective ranging area of the stations is governed by the modulation frequency employed, so that said area may be expanded or contracted by varying the modulation frequency.

The ranging system herein described is equally effective with communication station of the amplitude modulation or frequency modulation type.

The stations, in addition to ranging, may also be simultaneously employed for radiotelephone communication without interference with the interference with the ranging functions. This is attained by operating the ranging generator within a band of frequencies transcending the frequency band necessary for conveying audio intelligence and concurrently modulating the transmitter with the audio and ranging signals. By the use of band pass filters in conjunction with the receiver output, the ranging and intelligence signals are confined to separate channels feeding the requisite ranging and audio reproduction circuits, thereby eliminating interaction between functions.

An added feature of this system is its ability to double-check on range measurements by operating a station in sequence as a superior and inferior unit. In this manner the range indications between two positions may be taken first from one to the other and then in reverse order, thereby reducing the percentage of possible error.

Moreover, the receiver may incorporate directional antennae, whereby, in addition to the reception of ranging and intelligence signals, directional bearings may be taken between stations.

By knowing the azimuth and range of a station, the position thereof may be determined. Positional information may also be secured without the use of directional antenna by the use of a combination of three stations, situated at various points in the field. After obtaining the range from station to station, the positions thereof may be trigonometrically determined, the three sides of the triangle being known.

For a better understanding of my invention, together with other and further features and objects thereof, reference is had to the ensuing description, taken in connection with the accompanying drawings, wherein like parts are indicated by like reference numerals. The scope of my invention will be pointed out in the accompanying claims.

Figure 2:
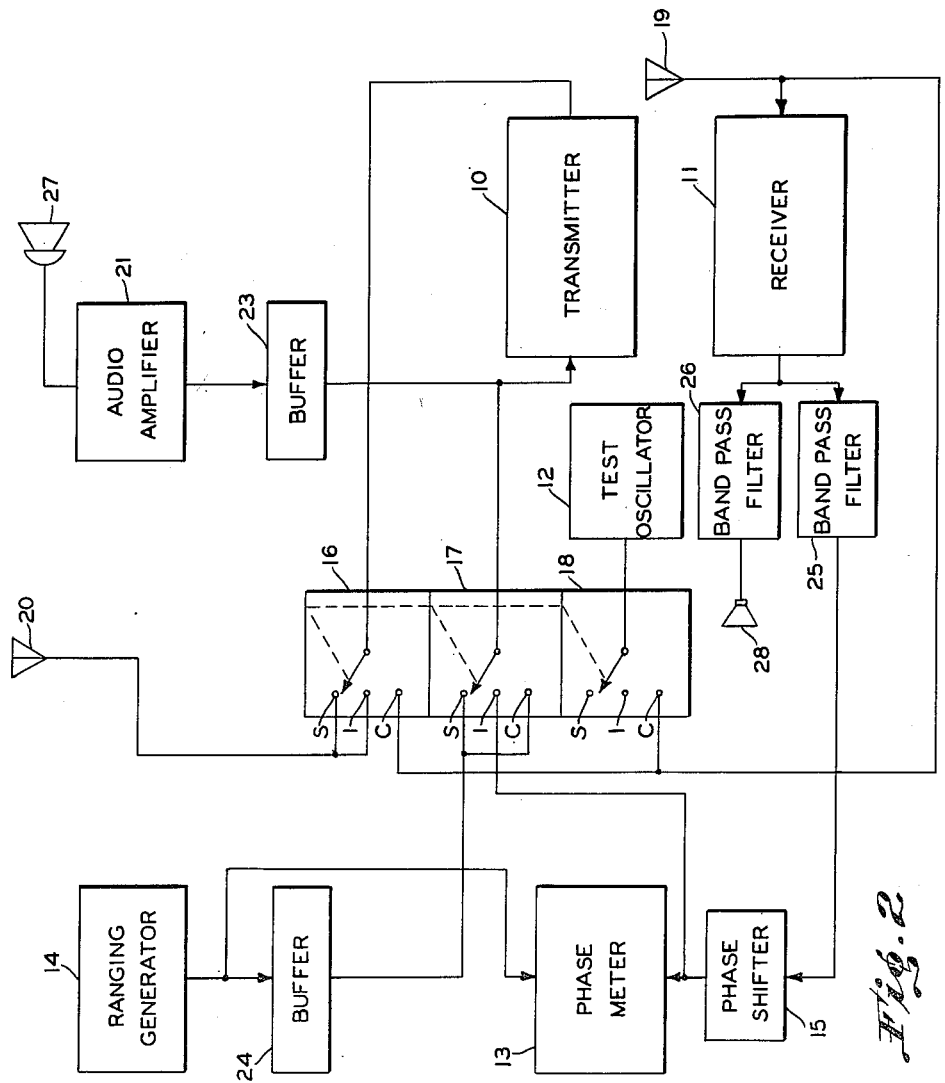

In the appended drawings,

Figure 1 is a block diagram of one embodiment of my invention in the form of a range-determining station, capable of operation as a superior or inferior station; and Figure 2 is a block diagram of a second embodiment of my invention in the form of a range-determining station, capable of operation as a superior or inferior station, and for radiotelephone communication.

For the sake of simplicity the station to be described is of the amplitude modulation type. Referring now to the drawings, and more particularly to Figure 1, a range-determining station is illustrated, consisting of a high frequency transmitter 10, a radio receiver 11, a test oscillator 12, a phase meter 13, a low frequency ranging generator 14, a phase shifter 15, and three tri-contact switches 16, 17, and 18. The switches 16, 17, and 18 are mechanically ganged, and serve to convert the stations from superior to inferior, or for calibration arrangement.

The transmitter 10 is of conventional design, comprising the usual master oscillator, buffer, and power amplifier stages. The carrier frequency may be any suitable channel in the radio spectrum. Also incorporated in the transmitter is a conventional modulator stage in any form capable of a high percentage of modulation.

The receiver 11 is of conventional design, superheterodyne or T. R. F., having wide band-pass characteristics. The resonant frequency of the receiver 11 is sufficiently distinct from the carrier of transmitter 10 so that it is not responsive thereto.

In practice, a station identical in all respects with that illustrated in Figure 1 functions as a superior or inferior station in cooperation therewith. The carriers of the inferior and superior transmitters are set in separate channels, while the superior receiver is tuned to the frequency of the inferior carrier and the inferior receiver is resonant to the superior carrier.

The low frequency ranging generator 14, of any conventional design, is capable of undistorted sine-wave oscillation at any point within a frequency band of a width sufficient to cover the range requirements of the system.

The test oscillator 12 is preferably a crystal-controlled oscillator, or one of similarly high stability, whose operating frequency is equal to the difference between the carrier frequency of transmitter 10 and the resonant frequency of receiver 11. Thus, if the output of test oscillator 12 is mixed with the carrier of transmitter 10, one of the resultant beat frequencies is equal to the resonant frequency of receiver 11.

It is to be noted that the radio frequency input stage of receiver 11 acts as a linear amplifier to incoming signals of normal strength but as a non-linear amplifier and therefore as a mixer in regard to the combination of the output of test oscillator 12 and the carrier of transmitter 10. This phenomenon is achieved by saturating the input of receiver 11 with an excessive magnitude of either carrier or test oscillator current.

The output of receiver 11 is connected to the input of phase shifter 15 which may be of the vacuum tube type, resistance-capacitance type, or any network capable of shifting the phase 0 degrees–360 degrees of a frequency within the operating limits of low frequency generator 14.

The phase meter 13 may be any suitable meter of the cathode-ray dynamometer, vacuum tube, or any type enabling precise phase comparison measurements between two sinusoidal waves of the same frequency. The output of the ranging generator is connected to one input terminal of meter 13, while the output of receiver 11 is connected to the other input terminal through phase shifter 15.

Switches 16, 17, and 18 are each provided with 3 contacts S, I, and C, and a sliding arm. The circuit is so arranged that when the arms of switches 16, 17, and 18 establish electrical connection with contact S, the unit functions as a superior station; when in connection with contact I, the unit functions as an inferior station; and when in connection with contact C, the unit is arranged for calibration.

It is, of course, essential, before operating the unit as either a superior or inferior station, to adjust the unit to eliminate all inherent variable phase shifts. Accordingly, the operating principles of this unit will be first treated with switches 16, 17, and 18 on calibration, that is on position C.

With switch 16 on contact C, the output of transmitter 10 is connected to the input of receiver 11. It is to be understood that there is no direct electrical connection therebetween, but rather that a small portion of the carrier power is applied to the receiver 11 input which is of a magnitude insufficient to block said receiver but sufficient to cause the input of receiver 11 to act in non-linear fashion. When switch 17 is on contact C, the output of ranging generator 14 is fed into the transmitter 10, thereby modulating the carrier thereof. With switch 18 on contact C, the output test oscillator 12 is bridged across the input of receiver 11. It is, of course, important in calibration that the ranging generator 14 of inferior and superior stations be set to precisely the same frequency.

One of the beat frequencies between the output of transmitter 10 and test oscillator 12, being equal to the resonant frequency of the receiver 11, is detected therein so that the output of the receiver 11 consists of the modulation component of the carrier of transmitter 10. The modulation component is imposed upon one of the inputs of phase meter 13 through phase shifter 15, and is compared in phase therein with the directly-obtained output of ranging generator 14.

In the course of its transition through transmitter 10 and receiver 11, the sine-wave modulation signal from generator 14 has been advanced or retarded in phase, depending upon the existing circuit conditions. The resultant phase shift is observable on the phase meter 13. By adjusting phase shifter 15 to a position cancelling the shift occurring in the receiver 11 and transmitter 10, the phase difference is restored to zero shift.

Now that the unit has been properly calibrated, and is available for ranging, it will be considered as a superior station with switches 16, 17, and 18, set to position S.

On S, the switch 16 connects the output of transmitter 10 to the antenna 20, while switch 17 connects the output of ranging generator 14 to the input of transmitter 10, thereby modulating the carrier, and switch 18 disconnects test oscillator 12 from the circuit.

The modulated carrier of transmitter 10 is radiated from antenna 20 and the transmission is received by the inferior station which constitutes a unit identical with that of Figure 1, except that switches 16, 17, and 18 are set on I. The operating details of the inferior unit will be later discussed but at the moment it is sufficient to know that the inferior station receives the modulated carrier of the superior station, demodulates said carrier and applies the modulation component to its transmitter, thereby retransmitting the modulation signal of the superior station.

The modulated carrier of the inferior station is received and demodulated by the superior receiver 11, and the modulation component is applied to the input of phase meter 13 through phase shifter 15. The modulation component in the receiver 11 output having been delayed in phase as a function of the distance to and from the inferior station, serves as an index of the range. The setting of phase shifter 15 corrects for shifts introduced by the equipment of the superior station so that the reading of meter 13 solely indicates the phase shift as a function of distance.

By the use of a chart in conjunction with the phase meter, whereupon for a specific modulation frequency the phase difference is graphically plotted against the range in yards or meters, the range may be readily determined. An alternative and more direct method of interpreting the phase difference in terms of distance is by the use of a delay network (not shown) interposed between the ranging generator 14 and the meter 15. The network is adjusted so that zero phase shift is brought about between the output of the ranging generator 14 and the receiver 11. The control dial of the delay network is graduated in terms of range, hence when zero shift is obtained, the distance may be ready directly on the dial. Other methods of securing direct range readings will suggest themselves to those skilled in the art.

The unit will now be examined as an inferior station with the switches 16, 17, and 18 set at position I. In practice, when the unit functions as an inferior station, calibration is first effected in the same manner as was hereinabove described in connection with the unit operating as a superior station, in order that the inferior station shall not contribute any phase displacement to alter the natural shift occuring as a result of the distance between stations.

With switch 16 on I, the transmitter output is loaded on antenna 20. When switch 17 is on I, the transmitter 10 input is in connection with the receiver 11 output through phase shifter 15. With switch 18 on I, the test oscillator 12 is dissociated from the circuit.

The modulated carrier from the superior station is received by antenna 19 and applied to receiver 11, where it is amplified and demodulated in the usual manner. The modulation component is then fed to the input of the transmitter 10 through phase shifter 15 which, as has been described, compensates for variable shifts present in the station equipment. The carrier of transmitter 10 is modulated by the modulation component and is radiated by antenna 20. It is to be noted that as an inferior station, the ranging generator 14 is not utilized except for calibration of the unit. The superior station receives the inferior transmission and range measurements are made in accordance with the previously described procedure.

Where it is desired to employ a range-determining ranging station for the purpose of radiotelephone communication in addition to ranging, the equipment described in connection with Figure 1 may be adapted to perform both functions without mutual interferences. Reference is now had to Figure 2, wherein a range-determining system, comprising, in addition to the elements shown in Figure 1, elements necessary to adapt the unit for communication. The elements in Figure 2 which are alike both in design and operation with those of Figure 1 are designated by identical numerals.

The added elements consist of an audio amplifier 21, a pair of buffer stages 23 and 24, a ranging frequency band pass filter 25, and an audio frequency band pass filter 26. A microphone 27 is connected to the input of amplifier 21 and a loud speaker 28 is connected to the output of band pass filter 25.

The output of audio amplifier 21 is connected to the transmitter 10 through a buffer stage 23. The buffer stage 24 associates ranging generator 14 with the S contact of switch 17. The output of receiver 11 is connected through the band pass filter 26 to the loud speaker 28 and through band pass filter 25 to phase shifter 15.

The ranging and communications elements of the unit operate simultaneously. It is the function of buffers 23 and 24 to prevent interaction between the range generator 14 and the amplifier 21. Likewise, it is the purpose of filters 25 and 26 to keep apart the ranging and communication signal in the output of receiver 11.

The frequency response of the audio amplifier 21 is designed to cut off frequencies above 3,500 cycles. This may be done without appreciably affecting the percentage of articulation of the communication system. The ranging generator 14 is maintained at a frequency level above 3,500 cycles.

The audio frequency filter 26 is designed to pass all frequencies up to 3,500 cycles and to discriminate against all others, whereas the ranging frequencies filter descriminates against all frequencies except those within the ranging band. In consequence, the intelligence signals actuate the loud speaker 28, but do not affect the phase meter 13 and conversely the ranging signals are passed through the phase meter 13 but not to loud speaker 28.

Although by way of exemplification I have assigned a particular bandwidth to the audio signals, this width is not critical and need not be rigidly adhered to as long as a distinct separation is made between ranging and communication signals.

In all other respects, the same principles underlie the operation of the unit illustrated in Figure 2 as that disclosed in Figure 1.

It is desirable to incorporate an automatic gain control circuit in the receiver 10 to compensate for changes in incoming signal strength which may give rise to phase shifts.

Since the nature and extent of the variable phase shifts arising in the stations will vary with ambient temperature, the transmitter adjustments and other considerations which, over a period of time, are not constant, it is advisable in practice in order to insure the accuracy of the system, to calibrate the stations prior to going into operation.

The station is not limited in its use to performance in conjunction with a cooperating inferior or superior station, but may be adapted to operate as an altimeter or object-detection system. This object is attained by tuning the receiver to the transmitter carrier frequency, and shielding the transmitting antenna from the receiving antenna in a manner whereby the receiver is only responsive to signals which are reflections of the carrier. Calibration is effected by applying a portion of the transmitter output 10 to the input of the receiver 11, and then adjusting the phase shifter 15 in the manner hereinabove described in connection with Figures 1 and 2. Since, in this instance, the receiver 11 is resonant to the carrier, the test oscillator 12 is dispensed with.

While there have been described what are at present considered preferred embodiments of my invention, it will be manifest to those skilled in the art that various changes and modifications may be made therein without departing from the invention, and it is therefore, aimed in the appended claims to cover all such changes and modifications as fall within the true spirit and scope of the invention.

I claim:

1. In an electromagnetic wave range-determining ranging station the combination comprising a transmitter having modulation means, a relatively low frequency sine-wave generator, a receiver, a phase shifting device having its input circuit coupled to the output of said receiver, a phase meter for comparing the time phase of two sinusoidal waves of the same frequency having a first input circuit connected to said generator and a second input circuit connected to the output of said phase shifting device and switching means coupling said modulation means of said transmitter to either said generator or to the output of said phase shifting device.

2. In an electromagnetic wave range-determining ranging station the combination comprising a transmitter operating in one frequency channel having modulation means, an antenna a relatively low frequency sine-wave generator, a receiver responsive to a second frequency channel, a phase shifting device having its input circuit coupled to the output of said receiver, a phase meter for comparing the time phase of two sinusoidal waves of the same frequency having a first input circuit connected to said generator and a second input circuit connected to the output of said phase shifting device, an oscillator operating on a frequency equal to the difference frequency of said transmitter frequency and said receiver frequency and three switching means, each of said three switching means having three corresponding positions, said first switching means connecting the output of said transmitter to an antenna in said first and second positions and to the input of said receiver in said third position, said second switching means connecting said modulation means to said generator in said first and third positions and to the output of said phase shifting device in said second position, said third switching means disconnecting the output of said oscillator from the input of said receiver in said first and second positions and connecting the output of said oscillator to the input of said receiver in said third position.

3. An electromagnetic wave station for the concurrent transmission and reception of intelligence and range-determining ranging signals comprising, a transmitter operating in a first frequency channel having modulation means, an antenna, a relatively low frequency fixed sine-wave generator, an intelligence amplifier responsive to frequencies below said generator frequency connected to said modulation means, a receiver responsive to a second frequency channel having a pair of band pass filters in the output thereof the first one of said filters passing said intelligence frequencies the second passing said generator frequency, a phase shifting device having its input circuit connected with the second of said filters, a transducer associated with said first filter, a phase meter for comparing the time phase of two sinusoidal waves of the same frequency having a first input circuit connected to said generator and a second input circuit connected to the output of said phase shifting device, an oscillator whose frequency is equal to the difference frequency of said transmitter frequency and said receiver frequency and three switching means, each of said three switching means having three corresponding positions, said first switching means connecting the output of said transmitter to an antenna in said first and second positions and to the input of said receiver in said third position, said second switching means connecting said modulation means to said generator in said first and third positions and to the ouput of said phase shifting device in said second position, said third switching means disconnecting the output of said oscillator from the input of said receiver in said first and second positions and connecting the output of said oscillator to the input of said receiver in said third position.

4. In an electromagnetic wave range determinining system comprising two ranging stations, wherein each of said ranging stations includes a transmitter having modulation means, a sine-wave generator, a receiver, a phase shifting device having its input circuit coupled to the output of said receiver, a phase meter for comparing the time phase of two sinusoidal waves of the same frequency having a first input circuit connected to said generator and a second input circuit connected to the output of said phase shifting device, and switching means coupling said modulation means of said transmitter to said generator in a first position or to the output of said phase shifting device in a second position, one of said ranging stations having its transmitter tuned to a first predetermined frequency and its receiver tuned to a second predetermined frequency and the other of said ranging stations having its transmitter tuned to said second predetermined frequency and its receiver tuned to said first predetermined frequency, whereby either ranging station may act as an initiating station by setting said switching means in said first position or may act as a relaying station by setting said switching means in said second position.

5. In an electromagnetic range determining station, apparatus comprising a transmitter tuned to a first frequency channel, said transmitter having modulation means, a sine-wave generator, means for coupling said generator to said modulation means, a receiver tuned to a second frequency channel, an adjustable phase shifting device having its input coupled to the output of said receiver, a phase meter for comparing the time phase of two sinusoidal waves of the same frequency having a first input circuit connected to said generator and a second input circuit connected to the output of said phase shifting device, an oscillator tuned to a frequency equal to the frequency difference between said first frequency channel and said second frequency channel, means for coupling said oscillator to the input of said receiver, and means for coupling the output of said transmitter to the input of said receiver, whereby inherent phase shifts in said apparatus may be ascertained and compensated for immediately prior to a range determination.

6. In an electromagnetic range determining station, apparatus comprising a transmitter tuned to a first frequency channel, said transmitter having modulation means, a sine-wave generator, means for coupling said generator to said modulation means, a receiver tuned to a second frequency channel, an adjustable phase shifting device having its input coupled to the output of said receiver, a phase meter for comparing the time phase of two sinusoidal waves of the same frequency having a first input circuit connected to said generator and a second input circuit connected to the output of said phase shifting device, an oscillator tuned to a beat frequency of said first frequency channel and said second frequency channel, means for coupling said oscillator to the input of said receiver, and means for coupling the output of said transmitter to the input of said receiver, whereby inherent phase shifts in said apparatus may be ascertained and compensated for immediately prior to a range determination.

7. In an electromagnetic range determining station, apparatus comprising a transmitter tuned to a first frequency channel, said transmitter having modulation means, a sine-wave generator, means for coupling said generator to said modulation means, a receiver tuned to a second frequency channel, an adjustable phase shifting device having its input coupled to the output of said receiver, a phase meter for comparing the time phase of two sinusoidal waves of the same frequency having a first input circuit connected to said generator and a second input circuit connected to the output of said phase shifting device, an oscillator for generating a signal which, when heterodyned with a signal in said first frequency channel, produces a signal having a frequency lying within said second frequency channel, means for coupling said oscillator to the input of said receiver, and means for coupling the output of said transmitter to the input of said receiver, whereby inherent phase shifts in said apparatus may be ascertained and compensated for immediately prior to a range determination.

GUSTAVE SHAPIRO.

REFERENCES CITED

The following references are of record in the file of this patent:

UNITED STATES PATENTS

| Number | Name | Date |
| --- | --- | --- |
| 1,717,064 | Rettenmeyer | June 11, 1929 |
| 2,147,810 | Alford | Feb. 21, 1939 |
| 2,248,727 | Strobel | July 8, 1941 |
| 2,253,958 | Luck | Aug. 26, 1941 |
| 2,418,143 | Stodola | Apr. 1, 1947 |
| 2,478,208 | Rothman | Aug. 9, 1949 |
| 2,524,050 | Gintzon | Oct. 3, 1950 |
| 2,546,973 | Chatterjea | Apr. 3, 1951 |